(12) United States Patent
Alfano

(10) Patent No.: US 9,694,899 B2
(45) Date of Patent: Jul. 4, 2017

(54) ROTORCRAFT TOP FAIRING HAVING A PROFILE IN THE SHAPE OF A TRUNCATED DROP OF WATER THAT IS PROVIDED WITH A HUMP OF UNEVEN SURFACE

(71) Applicant: AIRBUS HELICOPTERS, Marignane (FR)

(72) Inventor: David Alfano, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 190 days.

(21) Appl. No.: 14/547,586

(22) Filed: Nov. 19, 2014

(65) Prior Publication Data
US 2015/0147177 A1    May 28, 2015

(30) Foreign Application Priority Data
Nov. 27, 2013  (FR) ...................................... 13 02743

(51) Int. Cl.
*B64C 7/00* (2006.01)
*B64C 27/04* (2006.01)
*B64C 27/20* (2006.01)

(52) U.S. Cl.
CPC ................ *B64C 7/00* (2013.01); *B64C 27/04* (2013.01); *B64C 27/20* (2013.01)

(58) Field of Classification Search
CPC .. B64C 5/00; B64C 7/00; B64C 27/00; B64C 27/04; B64C 27/20; B64C 27/59; B64C 2700/6283; F05D 2220/329
See application file for complete search history.

(56) References Cited

U.S. PATENT DOCUMENTS

| 2,755,038 A | 7/1956 | Gluhareff |
| 3,331,444 A | 7/1967 | Toner |

(Continued)

FOREIGN PATENT DOCUMENTS

| CN | 101233045 A | 7/2008 |
| CN | 102642613 A | 8/2012 |

(Continued)

OTHER PUBLICATIONS

Korean Search Report for Korean Application No. KR 2014-0163615, Completed by the Korean Patent Office, Dated Jun. 20, 2016, English Translation Only 3 Pages.

(Continued)

*Primary Examiner* — Craig Kim
*Assistant Examiner* — Juan G Flores
(74) *Attorney, Agent, or Firm* — Brooks Kushman P.C.

(57) ABSTRACT

A rotorcraft provided on top with a fairing (3) arranged below the rotary wing of a main rotor of substantially vertical axis of the rotorcraft, and covering a mechanism enabling the blades of the rotary wing of the main rotor to be operated. The streamlined shape of the fairing (3) is shaped longitudinally like a drop of water that is truncated in its rear portion. The truncated portion (6) of the water-drop-shaped profile of the fairing (3) forms the rear wall of the fairing (3) and is provided with a transversely middle hump (7). Said hump (7) is provided with projections in relief (9) arranged as waves in a longitudinal succession extending along the side walls of the fairing (3), and the truncated portion (6) is arranged in a plane sloping towards the rear of the rotorcraft.

25 Claims, 3 Drawing Sheets

(56) References Cited

U.S. PATENT DOCUMENTS

| | | | | |
|---|---|---|---|---|
| 3,741,285 | A | * | 6/1973 | Kuethe .................. B64C 21/10 165/109.1 |
| 4,809,930 | A | * | 3/1989 | Ballerio .................. B64C 1/00 244/17.11 |
| 7,229,251 | B2 | | 6/2007 | Bertolotti et al. |
| 2005/0151001 | A1 | * | 7/2005 | Loper .................... B64C 27/14 244/6 |
| 2006/0269411 | A1 | | 11/2006 | Bertolotti et al. |
| 2011/0036954 | A1 | | 2/2011 | Piasecki |
| 2011/0058955 | A1 | | 3/2011 | Jung et al. |
| 2012/0104157 | A1 | | 5/2012 | Van Der Westhuizen |
| 2012/0138731 | A1 | | 6/2012 | Alfano |

FOREIGN PATENT DOCUMENTS

| | | |
|---|---|---|
| DE | 1114394 | 9/1961 |
| KR | 20100111984 | 10/2010 |
| WO | 2009088491 A2 | 7/2009 |

OTHER PUBLICATIONS

French Search Report for FR 1302743, Completed by the French Patent Office on Aug. 7, 2014, 6 Pages.
Chinese First Office Action Dated Mar. 2, 2016, Application No. 201410695780.6, Applicant Airbus Helicopters, 5 Pages.

\* cited by examiner

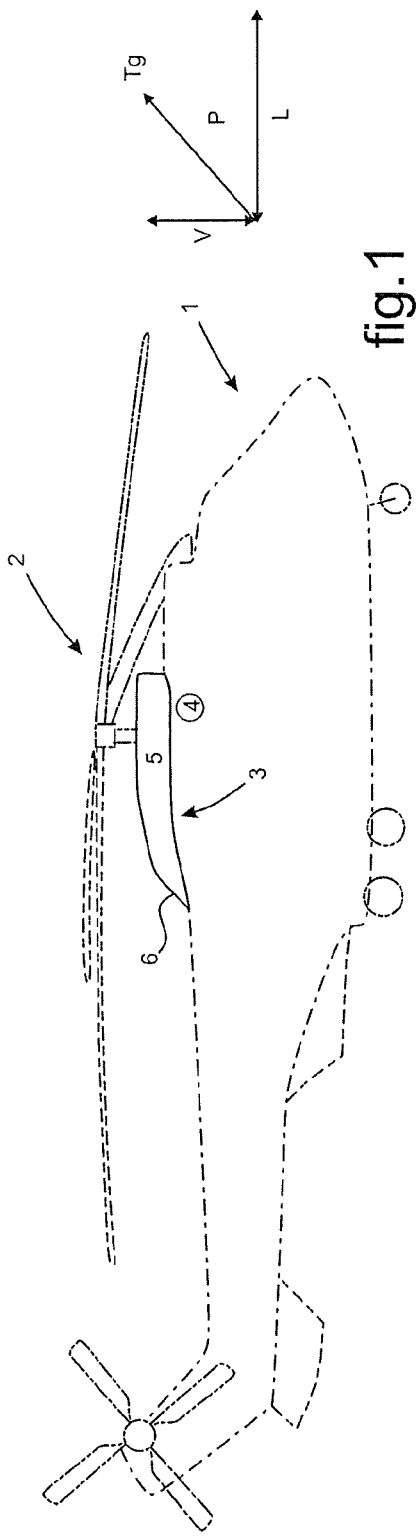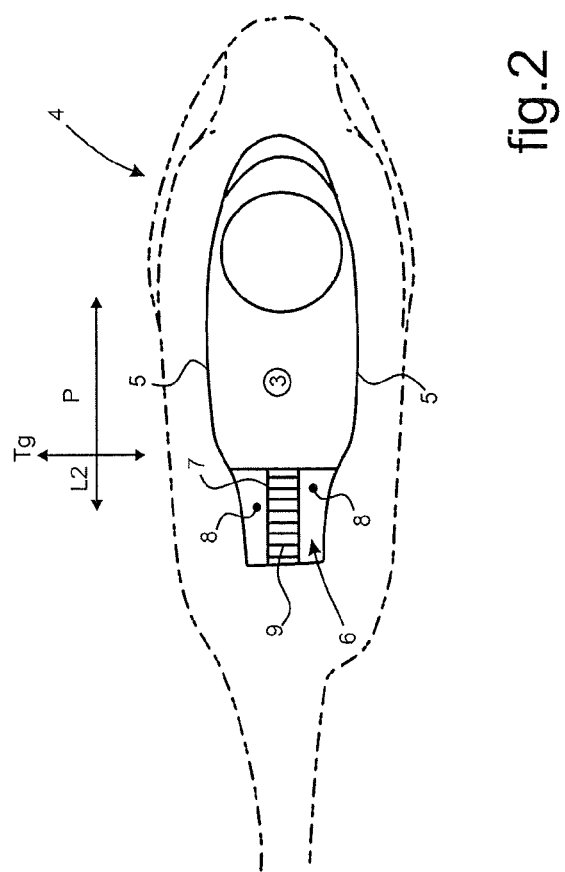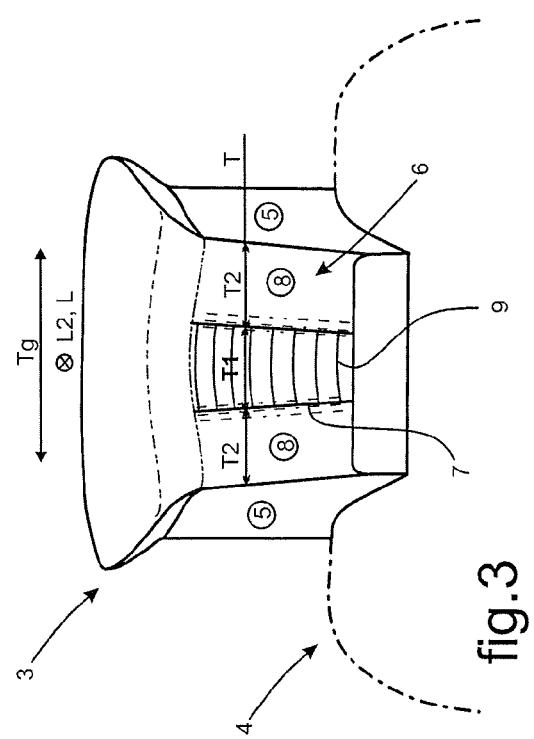

ROTORCRAFT TOP FAIRING HAVING A PROFILE IN THE SHAPE OF A TRUNCATED DROP OF WATER THAT IS PROVIDED WITH A HUMP OF UNEVEN SURFACE

CROSS REFERENCE TO RELATED APPLICATION

This application claims priority to French patent application No. FR 13 02743 filed on Nov. 27, 2013, the disclosure of which is incorporated in its entirety by reference herein.

BACKGROUND OF THE INVENTION (1) Field of the Invention

The present invention relates to means for influencing the flow of air over the outside surfaces of rotorcraft. The present invention relates more particularly to a fairing conventionally arranged at the top of a rotorcraft being located under the rotary wing of a main rotor having substantially a vertical axis and above a cover covering a power plant of the rotorcraft.

(2) Description of Related Art

A rotorcraft is a rotary wing aircraft having one or more rotors, including at least a main rotor of substantially vertical axis arranged at the top of the rotorcraft. The main rotor provides the rotorcraft at least with lift, and in the specific circumstance of a helicopter, possibly also with propulsion and/or guidance along any movement axis.

A rotorcraft may also have at least one auxiliary rotor of substantially horizontal axis. Conventionally, such an auxiliary rotor is installed at the end of a tail boom in order to control the yaw attitude of the rotorcraft. Such an auxiliary rotor can also be used to provide a rotorcraft with a propulsive propeller for moving the rotorcraft in translation.

The rotor(s) of a rotorcraft is/are conventionally driven in rotation by a power plant including at least one fuel-burning engine, in particular a turboshaft engine. The power plant is typically located in the upper portion of the rotorcraft beneath the rotary wing of the main rotor. A cover is arranged around the power plant in order to direct the flow of air towards the rear of the rotorcraft and enhance the aerodynamic characteristics of the rotorcraft.

Such a cover is commonly raised by a fairing that covers a mechanism for operating blades of the rotary wing of the main rotor in compliance with flight commands generated by a pilot of the rotorcraft.

For example, such a mechanism for controlling the blades of the rotary wing of the main rotor is commonly formed by a pair of "swashplates" movably mounted on a mast carrying the rotary wing. The swashplates are operated by a pilot of the rotorcraft using various control lines in order to cause the pitch of the blades of the rotary wing of the main rotor to vary collectively and/or cyclically so as to modify the attitude of the rotorcraft.

The cover and the fairing that raises it extend mainly in a longitudinal direction corresponding to the longitudinal direction in which the rotorcraft extends, conventionally considered as going between the front and the rear of the rotorcraft when on the ground.

Naturally, concepts such as "top", "high portion", "below", "bottom", or "raising", for example are commonly understood relative to the vertical orientation of the rotorcraft when on the ground. Likewise, concepts such as "vertical plane" and "horizontal plane" of the rotorcraft are commonly understood respectively relative to the vertical and horizontal general directions in which the rotorcraft extends when on the ground.

In this context, it is appropriate to arrange the fairing so as to reduce its aerodynamic drag as much as possible and so as to limit the wake that it generates. The arrangement of the fairing must in particular encourage the stream of air to remain attached along its surface by acting on the turbulence phenomena occurring at the rear of the fairing. Turbulent vortices form at the rear of the fairing where they constitute a source of drag and give rise to structural excitation of the outer walls of the rotorcraft and of the tail boom extending towards the rear of the rotorcraft.

A common solution consists in shaping the profile of the fairing in question to have the shape of a drop of water in a horizontal plane of the rotorcraft. In this context, reference may be made for example to the following documents: US 2011/036954 (Frederick W. Piasecki), U.S. Pat. No. 3,331, 444 (Charles V. Toner), US 2012/104157 (Van Der Westhuizen), DE 1 114 394 (United Aircraft Corp.), and US 2006/269411 (Fabio P. Bertolotti).

It has nevertheless been found that such a solution is not fully satisfactory for optimizing stabilization of the rotorcraft in the event of a side wind, of flying sideways, and/or of the rotorcraft sideslipping in yaw, in particular for light rotorcraft where it is desired to enhance their maneuverability in flight.

More particularly, among the constraints on how the fairing should be arranged, the flying quality of the rotorcraft must be preserved. In particular, it is necessary to avoid the flow of air along the fairing giving rise to instabilities in maintaining a heading and/or to disturbances in yaw attitude control of the rotorcraft. The sound nuisance produced by the flow of air along the outside surfaces of the rotorcraft must also be limited as well as possible.

It is found that when the flow of air around the rotorcraft includes a significant sideways vector component, the regularity of the flow of said turbulence towards the rear of the fairing is disturbed, and consequently the stability of the attitude of the rotorcraft in yaw is affected thereby.

More particularly, the turbulent vortices generated at the rear end of the fairing tend to move along the tail boom at a frequency and in a flow direction that are random.

Such an instability in the flow of the turbulence, which is made worse in the event of a side wind, of flying sideways, and/or of the rotorcraft sideslipping in yaw, has the effect of producing unwelcome vibration that may harm the mechanical strength of the rotorcraft and that can degrade passenger comfort. Furthermore, such a situation also gives rise to an increase in sound nuisance and tends to destabilize the yaw behavior of the rotorcraft.

In order to mitigate those drawbacks, it is known to truncate the waterdrop-shaped profile of the fairing transversely at its rear end. The effect of this is to improve the regularity of the flow of the turbulence in the event of a side wind, of flying sideways, and/or of sideslipping in yaw. Nevertheless, arranging the trailing edge of the fairing in that way tends to increase its aerodynamic drag, which is undesirable.

Finally, it is found that various specific arrangements for shaping the fairing in order to improve the flow of air for certain flight situations are unsuitable for other flight situations. As a result, it is necessary to find a compromise between various arrangements for the fairing in order to obtain the best possible flow of air that is satisfactory regardless of the flight situation of the rotorcraft.

It is also known for the rear wall of the fairing that is formed by truncating its waterdrop-shaped profile to be arranged as a plane that slopes relative to the horizontal plane of the rotorcraft. Such provisions seek to enhance the guidance of the flow of air along the fairing towards the bottom of the rotorcraft, it being understood that the rotation of the main rotor itself generates a powerful flow of air directed towards the bottom of the rotorcraft together with complex aerodynamic phenomena that disturb the stability of the behavior of the rotorcraft in flight.

Consequently, it is desirable for the overall arrangement and for specific features of the fairing concerning the flow of air along its surfaces to take account also of the wash generated by the main rotor.

However minor they might be, the various features applied to the fairing for the purpose of influencing the flow of air along its surfaces, and consequently along members arranged to the rear of the rotorcraft, interfere in combination with one another on the overall conditions of such a flow and of its effects.

Consequently, choices need to be made concerning using the various fairing features singly or jointly in order to obtain a flow of air towards the rear of the rotorcraft that is at best given the diversity of the problems mentioned above.

It is also desirable for the arrangement of the fairing to be usable without major modification, regardless of the general configuration of the rotorcraft, in order to avoid preparing a specific shape for the fairing that depends on the general structure of the rotorcraft, which structure varies among various families of rotorcraft.

As a result, there is a continuing search for a fairing shape that enhances a flow of air along its outside surface to obtain results that are satisfactory at best concerning the various constraints and requirements mentioned above. Thus, the specific aerodynamic arrangements selected for the outside surfaces of the fairing need to be selected in isolation while taking account of the effects that are produced when they are combined with one another.

The present invention lies in the context of such a search and seeks to propose a rotorcraft having a fairing of the above-mentioned type arranged at the top of the rotorcraft and presenting overall arrangements and specific aerodynamic features that ensure a flow of air towards the rear of the rotorcraft that satisfies the various above-mentioned problems that are raised in a manner that is satisfactory.

BRIEF SUMMARY OF THE INVENTION

The rotorcraft of the present invention is provided at its top with a fairing that is elongate in the longitudinal direction of the rotorcraft. Said fairing covers a mechanism enabling the pilot of the rotorcraft to operate the blades of a main rotor of substantially vertical axis. Such a fairing is conventionally arranged below the rotary wing of the main rotor and above a cover that covers a power plant of the rotorcraft.

The fairing fitted to the rotorcraft of the present invention is more specifically selected, when considered in a horizontal plane of the rotorcraft, as having an aerodynamic profile in the shape of a drop of water with its rear end being truncated transversely.

According to the present invention, such a fairing fitted to the rotorcraft is mainly recognizable in that its truncated portion arranged at the rear of the waterdrop-shaped profile of the fairing includes a hump arranged in a transversely middle zone of the truncated portion.

Such a choice for the overall organization of the fairing makes it possible not only to reduce its aerodynamic drag and to limit its weight, but also to tend to cause the turbulence generated at the rear end of the fairing to move in regular and stable manner, including when the stream of air surrounding the rotorcraft includes a significant sideways vector component.

The aerodynamic drag of the fairing is limited by reducing the size of the mean separation of the stream of air flowing along the fairing. The extent of the turbulent zone at the rear of the fairing is reduced and the frequency with which turbulent vortices flow past the rear of the cover is increased, thereby having the effect of enhancing dissipation of the turbulent vortices.

In an advantageous embodiment, at least said hump also includes projections in relief extending transversely, e.g. arranged as transverse waves following one another in succession along the hump. Such projections in relief serve to disturb the stream of turbulent air generating said turbulent vortices at the rear of the fairing, thus further enhancing the dissipation of the vortices that are generated. The aerodynamic drag of the fairing is thus limited.

Preferably, the projections in relief are preferably distributed regularly along the hump. Nevertheless, the local concentration of projections in relief on the hump may vary depending on the overall arrangement of the hump and on the desired effects concerning disturbing said turbulent stream of air.

As an indication, there may be five to 15 projections in relief that are preferably arranged with a pitch between two adjacent projections in relief lying in the range 0.01 to 3 times the transverse dimension of the fairing considered in the zone where its waterdrop-shaped profile is truncated.

In one embodiment, good results have been observed when the transverse dimension of the hump lies in the range 0.2 to 0.4 times the transverse dimension of the truncated portion. In addition, it has been found that a hump of height lying in the range 0.05 to 0.25 times the dimension of the longitudinal extent of the fairing gives satisfactory results.

In one possible embodiment, the join zones joining the hump to the sides of the truncated portion are shaped as concave arcs co-operating with the sides of the truncated portion to provide sharp edges.

In another possible embodiment, each of the join zones joining the hump to the sides of the truncated portion has two bends, each of said join zones being shaped in succession as a concave arc and as a convex arc providing rounded edges at the sides of the truncated portion.

More particularly, a major portion of each of the join zones joining the hump to the sides of the truncated portion considered between the concave arc and the side of the truncated portion, preferably extends along a convex arc defined by a circle centered on the transversely middle axis of the truncated portion.

Said circle is preferably selected to be of a diameter that is slightly greater than the transverse dimension of the truncated portion.

In a preferred embodiment, the rear wall of the fairing formed by said truncated portion of the waterdrop-shaped profile of the fairing is arranged in a sloping plane forming the trailing edge of the fairing.

Said inclined plane advantageously tapers towards the base of the truncated portion in order to drain the air stream flowing along the cover towards the hump. Furthermore, the maximum transverse dimension of the truncated portion is preferably selected to lie in the range 0.6 to 0.95 times the maximum transverse dimension of the fairing.

In a preferred embodiment, the projections in relief of the hump extend at least along the zones of the truncated portion on either side of the hump, and then preferably along the side walls of the fairing.

In a particular embodiment that enhances the looked-for guidance of the air stream along the surfaces of the fairing, the size of the projections in relief diminishes progressively in the direction in which they project going along the zones of the truncated portion beside the hump. Thereafter, the projections in relief increase in size in their projection direction going progressively towards the side walls of the fairing along which the projections in relief extend until their size in the direction of which they project diminishes progressively towards the front of the fairing.

BRIEF DESCRIPTION OF SEVERAL VIEWS OF THE DRAWINGS

Embodiments of the present invention are described with reference to the figures of the accompanying sheets, in which:

FIG. 1 is a diagrammatic side view showing the silhouette of a rotorcraft having a top fairing in accordance with the present invention;

FIG. 2 is a plan view of a fairing on a rotorcraft such as the rotorcraft shown in FIG. 1;

FIG. 3 is a rear view of the fairing shown in FIG. 2;

DETAILED DESCRIPTION OF THE INVENTION

Figure 4:
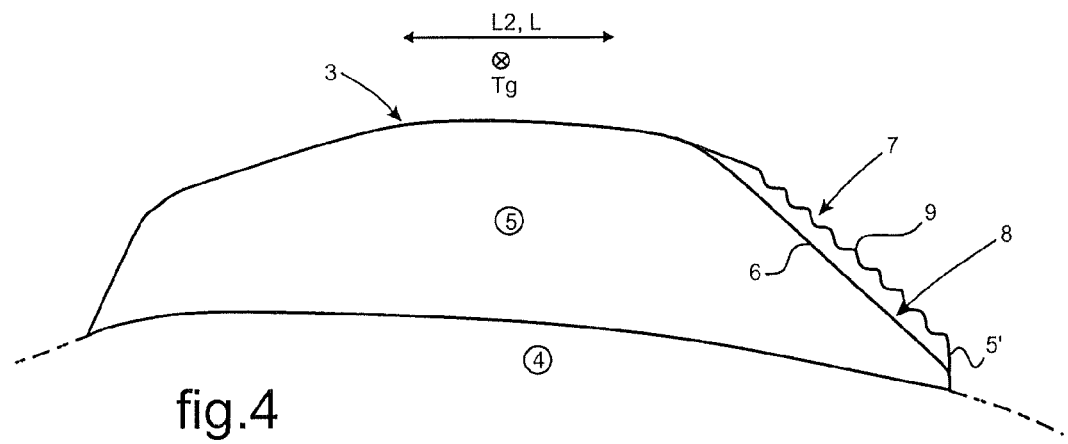
FIG. 4 is a side view of the fairing shown in FIGS. 2 and 3.

In FIG. 1, a rotorcraft 1 is conventionally provided with a main rotor 2 of substantially vertical axis providing the rotorcraft 1 at least with lift, and possibly also with propulsion and/or guidance along any progress axis. The rotorcraft 1 is also provided on top relative to the vertical direction V in its normal orientation, with a power plant used at least for driving the main rotor 2.

A fairing 3 for protecting a mechanism for operating the blades of the rotary wing constituted by the main rotor 2 is provided in conventional manner on top of a cover 4 for protecting the power plant.

Said fairing 3 is arranged below the rotary wing of the main rotor 2 and it extends longitudinally in the longitudinal direction L1 in which the rotorcraft 1 extends, conventionally considered as being between the front and the rear of the rotorcraft 1 when on the ground.

The streamlined profile of the fairing 3 considered in a horizontal plane P in which the rotorcraft 1 extends is arranged like a drop of water that is truncated at its rear directed towards the rear of the rotorcraft 1. As a result, the rear wall of the fairing 3 is formed by the truncated portion 6 arranged at the rear of the waterdrop-shaped profile of the fairing 3, said truncated portion 6 extending transversely in the transverse direction Tg of the rotorcraft 1. In the embodiment shown, said truncated portion 6 is arranged in a plane sloping relative to said horizontal plane P in which the rotorcraft 1 extends.

In FIGS. 2 to 8, the truncated portion 6 of the fairing 3 is provided with a hump 7 located transversely in its middle and extending along the direction of the longitudinal orientation L2 of the fairing 3. More particularly in FIG. 3, the transverse dimension T1 of the hump 7 is substantially equivalent to the transverse dimensions T2 of the zones 8 of the truncated portion 6 on either side of the hump 7.

In the selected example as shown, in which the truncated portion 6 tapers towards its base, the hump 7 tapers in the same direction as the truncated portion 6. Under such circumstances, it is clear that the relative transverse dimensions T1 and T2 between the hump 7 and the adjacent zones 8 of the truncated portion 6 should be considered locally relative to each other. More particularly, for a given transverse dimension T of the truncated portion 6, the transverse dimension T1 of the hump 7 and the transverse direction T2 of each of the zones 8 of the truncated portion 6 beside the hump are substantially equivalent, each corresponding substantially to one-third of the transverse dimension T of the truncated portion 6.

Furthermore, in FIGS. 2 to 8, at least the hump 7 is provided with projections in relief 9 extending in the direction of the transverse orientation Tg of the fairing 3 corresponding to the direction of the transverse orientation of the rotorcraft.

Such projections in relief 9 make the outer surface of the hump 7 uneven, being arranged in particular as waves longitudinally in succession, as can be seen more particularly in FIG. 4.

It should be observed that depending on the effects specifically procured by the projections in relief 9, the wavy shape of the profile of the projections in relief 9 may be adapted to constitute arrangements analogous to more or less zigzag lines.

In the embodiment shown, the projections in relief 9 are eight to ten in number, and they are regularly distributed along the hump 7, with respective depths that are equivalent.

Nevertheless, the number, the concentration, the regularity in the shape of their profile, the regularity with which they follow one another, and/or the sizes of the projections in relief 9 may vary depending on the results specifically obtained for fairings of dimensions that vary from one fairing to another.

Figure 5:
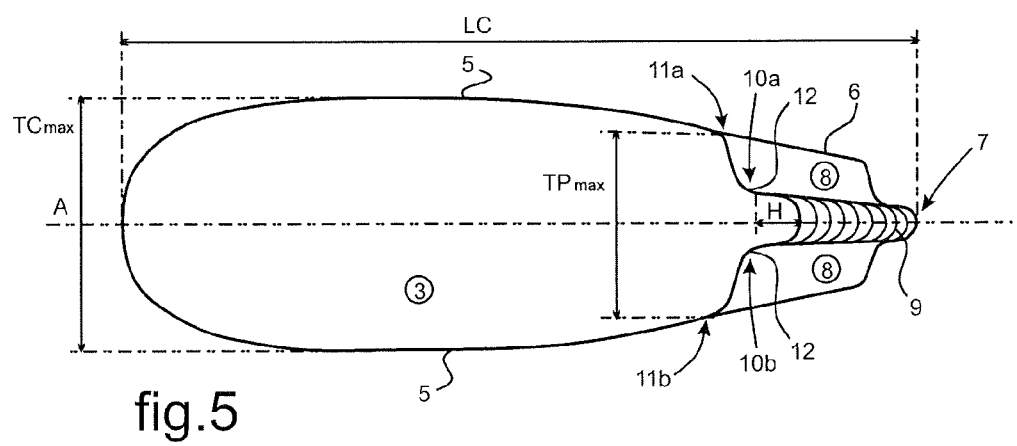
FIGS. 5 and 6 are diagrammatic plan views of fairings in accordance with the present invention, showing respective variants relating to the ways in which connections are made between a hump and the sides of the rear wall of the fairing.
Figure 6:
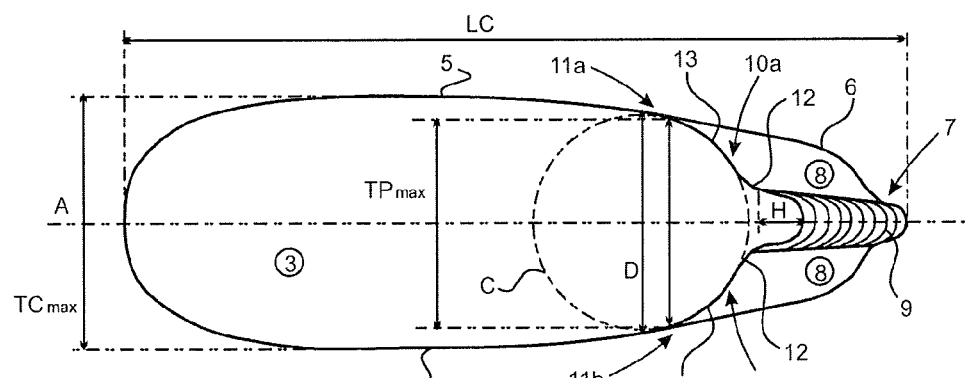

In FIGS. 5 and 6, the maximum transverse dimension $TP_{max}$ of the truncated portion 6 lies in the range 0.6 to 0.95 times the maximum transverse dimension $TC_{max}$ of the fairing 3.

In addition, the height H of the hump 7 lies substantially in the range 0.05 to 0.25 times the dimension of the longitudinal extent LC of the fairing 3.

Furthermore, the join zones 10a, 10b where the hump 7 joins the sides 11a, 11b of the truncated portion 6 may be potentially arranged in various ways in order to optimize the results obtained concerning the conformation and/or the overall dimensions of the fairing 3.

For example, in FIG. 5, each of said join zones 10a, 10b is of concave arcuate shape 12 providing substantially sharp edges with the sides 11a, 11b of the truncated portion 6, such that the discontinuity in the shape of the rear end of the fairing 3 provided by the truncated portion is optimized.

Also by way of example, in FIG. 6, each of said join zones 10a, 10b presents two bends, each being shaped successively as a concave arc 12 and as a convex arc 13 so that the edges of the sides 11a, 11b of the truncated portion 6 are significantly rounded. These provisions are such that the discontinuity in the shape of the rear end of the fairing 3 provided by the truncated portion 6 is softened.

More particularly, the major portion of each of said join zones 10a, 10b extends along a convex arc 13 between the concave arc 12 and the side 11a, 11b of the truncated portion 6. Said convex arc 13 is defined by a circle C that is centered, like the hump 7, on the transversely middle axis A of the truncated portion 6. The diameter D of said circle C is slightly greater than the transverse dimension T of the truncated portion 6.

Figure 7:
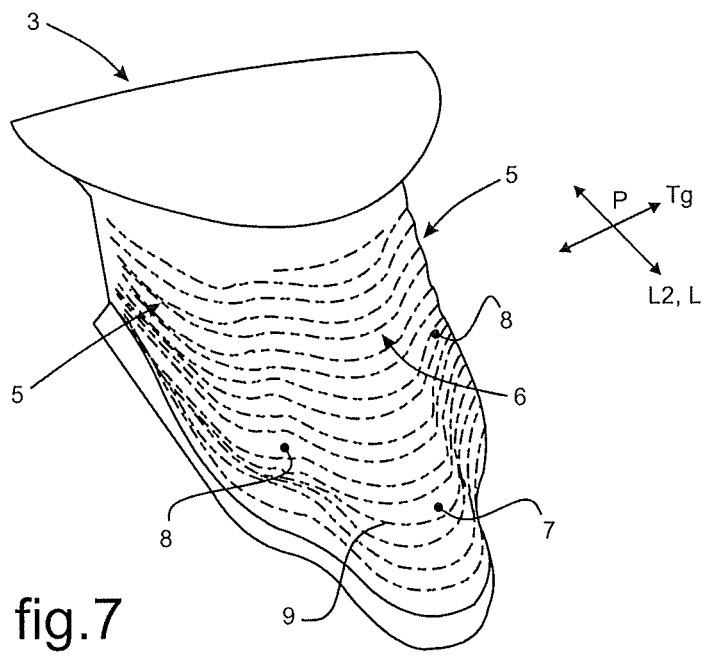
FIGS. 7 and 8 are views showing another embodiment of a fairing in accordance with the present invention, respectively in rear perspective view for FIG. 7 and in rear side perspective view for FIG. 8.
Figure 8:
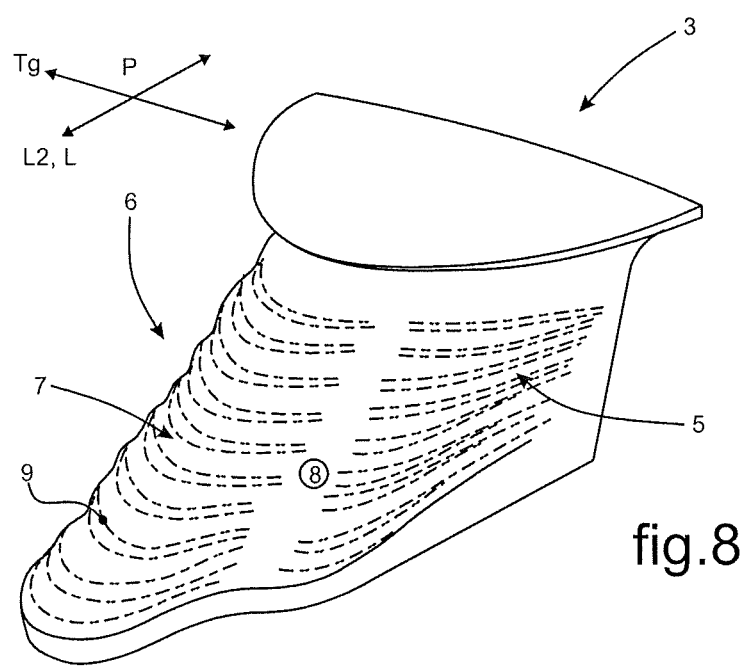

In FIGS. 7 and 8, the projections in relief 9 of the hump 7 extend along zones 8 of the truncated portion 9 on either side of the hump 7, and then along the side walls 5 of the fairing 3. The projections in relief 9 taper progressively along the zones of the truncated portion 6 on either side of the hump 7. Thereafter, the projections in relief 9 increase in size progressively going towards the side walls 5 of the fairing 3 along which the projections in relief 9 extend until their projecting extent tapers progressively going towards the front of the fairing 3.

What is claimed is:
1. A rotorcraft comprising:
   a fairing extending longitudinally along the longitudinal direction of the rotorcraft, the fairing covering a mechanism enabling a pilot of the rotorcraft to operate the blades of a main rotor having a substantially vertical axis by being arranged below the rotary wing of the main rotor and raising a cover covering a power plant of the rotorcraft, the profile of the fairing considered in a horizontal plane of the rotorcraft having the shape of a drop of water with its rear end being truncated transversely, wherein the truncated portion arranged at the rear of the waterdrop-shaped profile of the fairing includes a hump protruding from a transversely middle zone, wherein a hump contour is separated from lateral sides of the truncated portion by join zone contours.
2. The rotorcraft according to claim 1, wherein at least the hump includes projections in relief extending transversely and arranged as transverse waves following one another in succession along the hump.
3. The rotorcraft according to claim 2, wherein the projections in relief are distributed regularly along the hump.
4. The rotorcraft according to claim 2, wherein the projections in relief are arranged with a pitch between two adjacent projections in relief lying in the range 0.01 to 3 times the transverse dimension of the fairing considered in the zone where its waterdrop-shaped profile is truncated.
5. The rotorcraft according to claim 2, wherein the projections in relief of the hump extend along zones of the truncated portion on either side of the hump and then along the side walls of the fairing.
6. The rotorcraft according to claim 1, wherein the transverse dimension of the hump lies in the range 0.2 to 0.4 times the transverse dimension of the truncated portion.
7. The rotorcraft according to claim 1, wherein the height of the hump lies in the range 0.05 to 0.25 times the dimension of the longitudinal extent of the fairing.
8. The rotorcraft according to claim 1, wherein the join zone contours joining the hump to the lateral sides of the truncated portion are shaped as concave arcs co-operating with the lateral sides of the truncated portion to provide sharp edges.
9. The rotorcraft according to claim 1, wherein the join zone contours joining the hump to the lateral sides of the truncated portion has two bends, each bend being shaped in succession as a concave arc and as a convex arc providing rounded edges of the truncated portion.
10. The rotorcraft according to claim 9, wherein a major portion of each of the join zone contours joining the hump to the lateral sides of the truncated portion, considered between the concave arc and the side of the truncated portion, extends along a convex arc defined by a circle centered on the transversely middle axis of the truncated portion, the circle being of a diameter that is slightly greater than the transverse dimension of the truncated portion.
11. The rotorcraft according to claim 1, wherein the rear wall of the fairing formed by the truncated portion of the waterdrop-shaped profile of the fairing is arranged in a sloping plane forming the trailing edge of the fairing.
12. The rotorcraft according to claim 11, wherein the sloping plane tapers towards the base of the truncated portion, the maximum transverse dimension ($TP_{max}$) of the truncated portion lying in the range 0.6 to 0.95 times the maximum transverse dimension ($TC_{max}$) of the fairing.
13. A rotor craft comprising:
   a fairing extending longitudinally along the longitudinal direction of the rotorcraft and arranged below the rotary wing of the main rotor and covering a power plant of the rotorcraft, the fairing comprising:
      a truncated portion sloped between a vertical plane and a horizontal plane in the longitudinal direction and a transverse direction;
      a hump extending in the longitudinal direction and arranged in a transversely middle zone of the truncated portion;
      a pair of side zones arranged on lateral sides of the hump along the truncated portion and separated from the hump by join zones,
      wherein the side zones have a contour different from a hump contour.
14. The rotorcraft according to claim 13, wherein the hump includes a plurality of projections in relief formed in succession in the longitudinal direction along the hump.
15. The rotorcraft according to claim 14, wherein the plurality of projections in relief included in the hump are distributed regularly in the longitudinal direction along the hump.
16. The rotorcraft according to claim 14, wherein the projections in relief are arranged with a pitch between two adjacent projections in relief lying in the range 0.01 to 3 times the transverse dimension of the fairing considered in the truncated portion.
17. The rotorcraft according to claim 14, wherein the transverse dimension of the hump lies in the range 0.2 to 0.4 times the transverse dimension of the truncated portion.
18. The rotorcraft according to claim 14, wherein the height of the hump lies in the range 0.05 to 0.25 times the dimension of the fairing in the longitudinal direction.
19. The rotorcraft according to claim 13, wherein the hump includes a plurality of projections spaced apart in the longitudinal direction.
20. The rotorcraft according to claim 13, wherein the hump has a wave profile extending in the longitudinal direction.
21. The rotorcraft according to claim 13, wherein the each of the join zones is shaped as a concave arc.
22. The rotorcraft according to claim 13, wherein each of the join zones has two bends shaped in succession as a concave arc and as a convex arc co-operating with the side zones to define rounded edges of the truncated portion.
23. The rotorcraft according to claim 22, wherein a major portion of each of the join zones extends along a convex arc defined by a circle centered on the transversely middle axis of the truncated portion, the circle being of a diameter that is slightly greater than a transverse dimension of the truncated portion.

24. The rotorcraft according to claim 13, wherein the fairing has a streamlined profile and a cover profile arranged around the power plant, the streamlined profile of the fairing being above cover profile and having a water drop shape in a horizontal plane of the rotorcraft, the truncated portion and the hump being arranged at a rear end of the streamlined profile of the fairing.

25. A fairing adapted to extend longitudinally along the longitudinal direction of a rotorcraft below the rotary wing of the main rotor to cover a power plant of the rotorcraft, the fairing comprising:
 a truncated portion defining a trailing edge of the fairing, the truncated portion being sloped in the longitudinal direction a transverse direction between a vertical plane and a horizontal plane;
 a hump extending in the longitudinal direction and arranged in a transverse middle zone of the truncated portion and having a convex contour;
 a pair of side zones arranged on lateral sides of the hump along the truncated portion and having at least a concave contour adjacent the hump.

* * * * *